W. JOHNSON.
STUFFING BOX.
APPLICATION FILED NOV. 2, 1909.
975,045.
Patented Nov. 8, 1910.
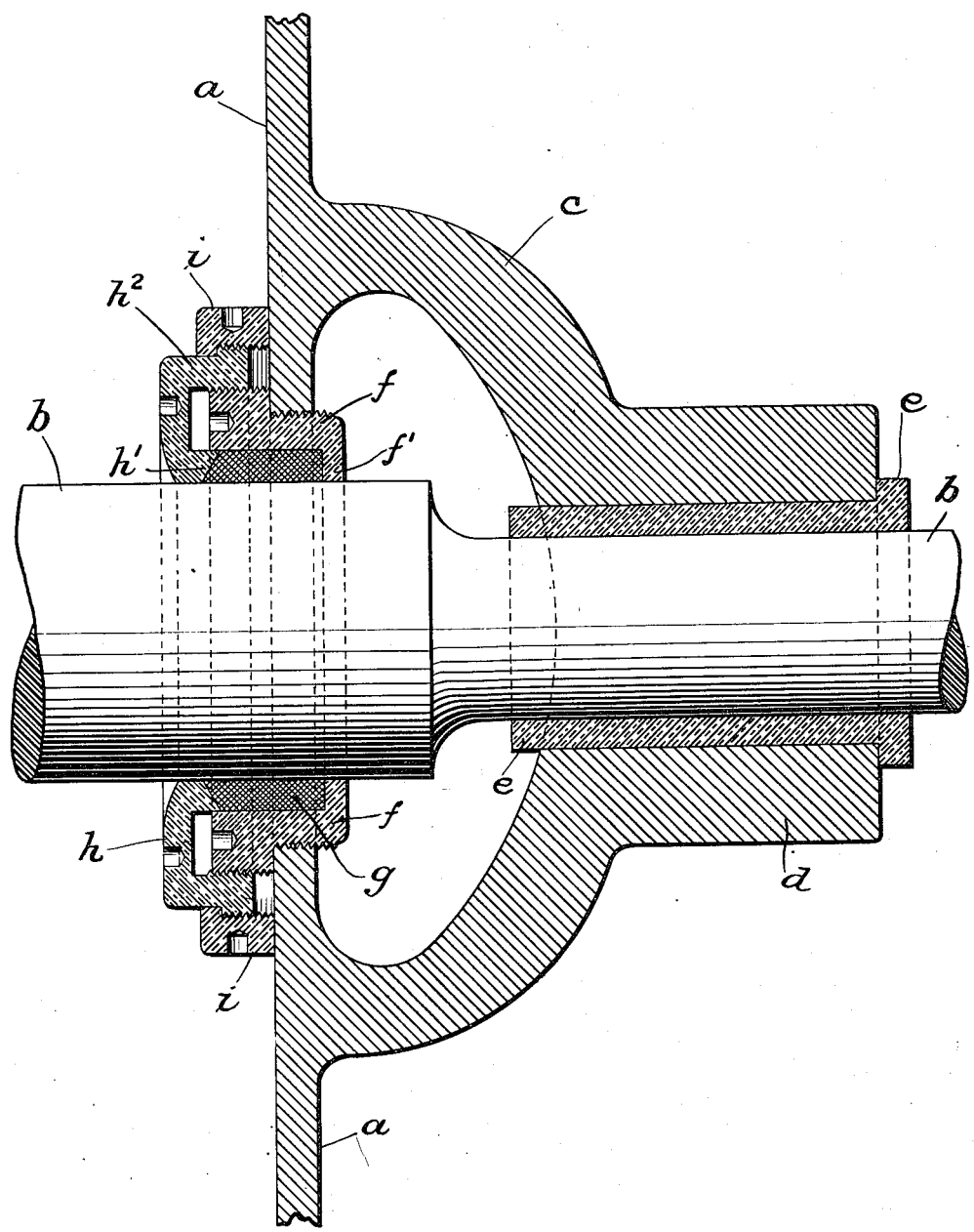
WITNESSES:
INVENTOR
Wills Johnson
BY
Harding & Harding
ATTORNEYS.

UNITED STATES PATENT OFFICE

WILLS JOHNSON, OF WILMINGTON, DELAWARE, ASSIGNOR TO E. I. DU PONT DE NEMOURS POWDER COMPANY, OF WILMINGTON, DELAWARE, A CORPORATION OF NEW JERSEY.

STUFFING-BOX.

975,045.

Specification of Letters Patent.    Patented Nov. 8, 1910.

Application filed November 2, 1909. Serial No. 525,864.

*To all whom it may concern:*

Be it known that I, WILLS JOHNSON, a citizen of the United States, residing at Wilmington, county of Newcastle, and State of Delaware, have invented a new and useful Improvement in Stuffing-Boxes, of which the following is a full, clear, and exact description, reference being had to the accompanying drawings, which form a part of this specification.

The object of my invention is to provide a stuffing box especially suitable for application to powder mixing machines in which it is of the utmost importance to prevent powder from getting between the mutually revolving parts, which condition, when it occurs, often results in firing the mass, with resultant destruction of the machine and danger to life.

In the drawing, which shows the application of the invention to a powder mixing machine, the figure represents a cross-section through the stuffing box.

The powder mixing machine as a whole is not illustrated, as the same forms no part of my invention, and therefore only the part thereof to which my improved stuffing box is applied is illustrated.

$a$ represents one wall of the revoluble mixing chamber and $b$ the revoluble shaft that carries the blades (not shown) that rotate within the mixing chamber. Projecting from and outside the wall $a$ of the box is the annular wing $c$ having a projecting sleeve $d$ forming the bearing for the reduced section of the shaft $b$.

$e$ is a bushing between the sleeve $d$ and shaft $b$.

A circular hole is cut through the wall $a$ of the mixing chamber to accommodate the enlarged section of the shaft $b$ and leave an annular space around the shaft to receive the metal box. This box is of greater internal diameter than the shaft and is thus adapted to inclose between it and the shaft a packing $g$ of hemp or other suitable material and is provided at its outer end with an internal annular flange $f'$ adapted to loosely fit the shaft. The outer part of the box $f$ is threaded in the orifice in the wall of the mixing chamber. The inner part of the box $f$ is of enlarged diameter, forming an annular shoulder that abuts against the inner wall of the powder chamber when the box is in place.

$h$ is a gland surrounding the shaft back of the box $f$, said gland having a short flange $h'$ extending between the shaft and the inner end of the box and abutting against the packing $g$ and holding it in place and having, at its largest diameter, an annular flange $h^2$ screw-threaded internally to engage an external screw-thread on enlarged section of the box, and screw threaded externally to receive an internally threaded cover ring $i$, which abuts against the inner wall of the chamber. The externally threaded, or outer, part of the flange $h^2$ of the gland $h$ is of slightly enlarged diameter, forming a shoulder against which abuts a short inturned flange on the inner edge of the cover-ring. It will be observed that the gland is on the inside of the chamber or next to the liquid to be contained therein and effectually holds in place the packing, and that the cover ring is on the outside of the gland and effectually prevents powder from passing from the chamber between the gland and the side of the box, thus allowing the outside parts to be easily wiped off and kept clean and preventing any leakage around the shaft.

Having now fully described my invention, what I claim and desire to protect by Letters Patent is:

1. In a stuffing box, in combination, a shaft, a box engaging the shaft and adapted to receive a packing, a gland engaging the shaft and box and adapted to hold the packing in place and encircling the box, and a cover-ring encircling the gland and box.

2. In a stuffing box, in combination, a box adapted to inclose a packing, a gland adapted to engage said packing and hold it in place and having a flange extending around and engaging the box, and a cover-ring extending around and engaging the gland.

3. In a stuffing box, in combination, a box adapted to inclose a packing, a gland adapted to engage said packing and having a flange threaded on the outside of the box, and a cover ring threaded on the outside of the gland.

4. In a stuffing box, in combination, a box adapted to inclose a packing and having two external threads, a gland adapted to engage said packing and having a flange provided with an internal thread engaging one of the threads of the box and an external thread, and a cover-ring having an internal thread engaging the external thread on the gland.

5. In a stuffing box, in combination, a box having an internal flange at the outer end adapted to receive a packing, a gland at the inner end of the box having a flange extending within the box to hold the packing in place and a flange surrounding and engaging the box, and a cover ring surrounding and engaging the gland.

6. In a stuffing box, in combination, a box having a relatively contracted externally threaded section and a relatively enlarged externally threaded section and provided with an inturned flange and adapted to contain a packing, a gland engaging the box and holding the packing in place, and a cover ring surrounding and engaging the gland.

7. In a stuffing box, in combination, a box adapted to receive a packing, a gland at the inner end of the box having a flange extending within the box to hold the packing in place and a flange surrounding the inner end of the box, the last named flange having an enlarged outer end, and a cover ring threaded on the enlarged outer end of the gland and having at its inner end an inturned flange adapted to abut against the enlarged section of the gland.

8. In a stuffing box, in combination, a box having a relatively contracted externally threaded section and a relatively enlarged externally threaded section and provided with an inturned flange and adapted to contain a packing, a gland having a flange extending within the box to hold the packing in place and a flange surrounding and threaded on the enlarged section of the box, the last named flange having an enlarged end section forming an external shoulder, and a cover-ring surrounding and threaded on the enlarged outer end of the gland and having an inturned flange adapted to abut against said shoulder.

9. The combination with a chamber wall and a shaft extending through an orifice in said wall of greater diameter than the shaft, of a box surrounding the shaft and extending through and engaging said orifice, a gland inside said wall surrounding said shaft and engaging said box, and a cover ring surrounding said gland and box and adapted to abut against the inside of said wall.

10. The combination with a chamber wall and a shaft extending through an orifice in said wall of greater diameter than the shaft, of a box surrounding the shaft extending through and engaging said orifice and adapted to confine a packing against the shaft, and a gland inside said wall and encircling said box and adapted to engage the packing and hold it in place.

11. The combination with a chamber wall and a shaft extending through an orifice in said wall of greater diameter than the shaft, of a box surrounding the shaft extending through and engaging said orifice and adapted to confine a packing against the shaft, and means surrounding said box and abutted against the inside of said wall and adapted to prevent leakage from the chamber to said box.

12. The combination with a chamber wall and a shaft extending through an orifice in said wall of greater diameter than the shaft; of a box surrounding said shaft and having a reduced section threaded in said orifice, an inturned flange at its outer end, and an enlarged section forming a shoulder adapted to abut against the inner side of the chamber wall; a gland inside the chamber wall and surrounding the shaft and having a flange extending within the box and a flange threaded on the outside of the enlarged section of the box, said flange having an enlarged outer end forming a shoulder; and a cover ring threaded on the outside of the enlarged section of the last named gland flange and adapted to abut against the inner side of the chamber wall and having a flange adapted to abut against the last named shoulder.

In testimony of which invention, I have hereunto set my hand, at Wilmington, Del., on this 29th day of October, 1909.

WILLS JOHNSON.

Witnesses:
WM. G. RAMSAY,
EDW. J. AMORY.